United States Patent [19]

Evenson et al.

[11] Patent Number: 5,439,310

[45] Date of Patent: Aug. 8, 1995

[54] CONNECTOR SYSTEMS FOR STRUCTURES

[75] Inventors: Erik E. Evenson; Christian P. Lupo, both of Houston; Clarence J. Wesselski, Alvin, all of Tex.

[73] Assignee: The United States of America as represented by United States National Aeronautics and Space Administration, Washington, D.C.

[21] Appl. No.: 66,271

[22] Filed: May 25, 1993

[51] Int. Cl.6 .............................................. F16B 21/06
[52] U.S. Cl. ...................................... 403/321; 403/24; 403/18; 52/655.1
[58] Field of Search ............... 52/646, 648.1, 654.1, 52/655.1; 403/18, 321, 322, 324, 325, 24; 292/80; 411/44, 55, 57

[56] References Cited

U.S. PATENT DOCUMENTS

| | | | |
|---|---|---|---|
| 4,232,497 | 11/1980 | Meschnig | 52/506 |
| 4,455,103 | 6/1984 | Hackenberg | 403/322 |
| 4,641,798 | 2/1987 | De Haan et al. | 403/322 |
| 4,763,459 | 9/1988 | Wesselski | 52/646 |
| 4,878,791 | 11/1989 | Kurihara et al. | 441/55 |
| 4,890,966 | 1/1990 | Umezawa | 411/57 |
| 4,934,885 | 6/1990 | Woods et al. | 411/44 |
| 4,998,842 | 3/1991 | Sheridan | 403/252 |
| 5,186,567 | 2/1993 | Evenson et al. | 403/7 |
| 5,190,392 | 3/1993 | Parma et al. | 403/171 |
| 5,244,406 | 9/1993 | Vranish | 439/362 |
| 5,265,972 | 11/1993 | Bahr | 52/655.1 |
| 5,320,395 | 6/1994 | Gernhardt et al. | 294/86.4 |

Primary Examiner—Richard A. Bertsch
Assistant Examiner—William Wicker
Attorney, Agent, or Firm—James M. Cate; Guy M. Miller; Edward K. Fein

[57] ABSTRACT

A releasable coupling device for connecting two members to one another where a collet type fastener has normally retracted latching fingers insertable into a latching recess and a longitudinally movable expander for activating the fastener. The longitudinal movement is retained with a paraffin actuated system which can reset. The longitudinal movement of the expander in one direction is through a one way threaded ratchet system which provides an automatic locking action and the expander is movable in either direction by an independently operated threaded action.

11 Claims, 4 Drawing Sheets

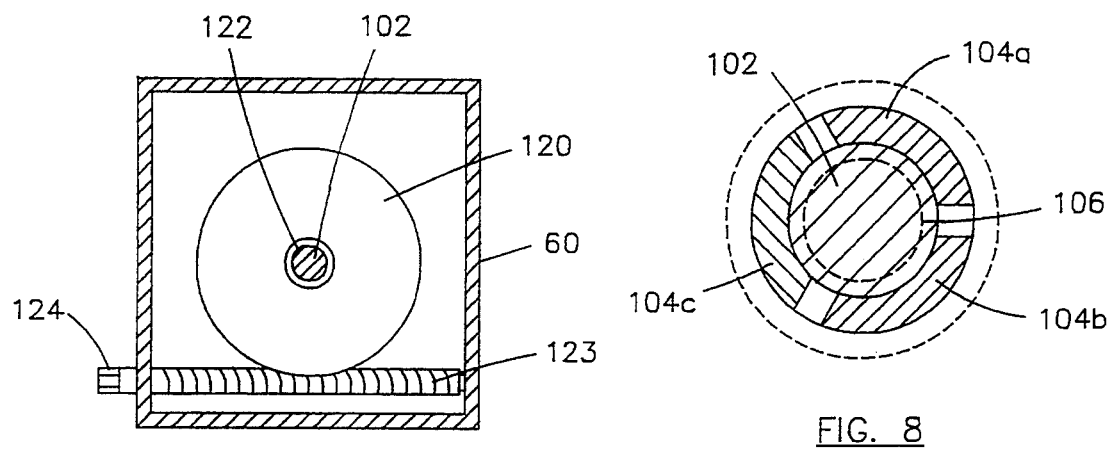
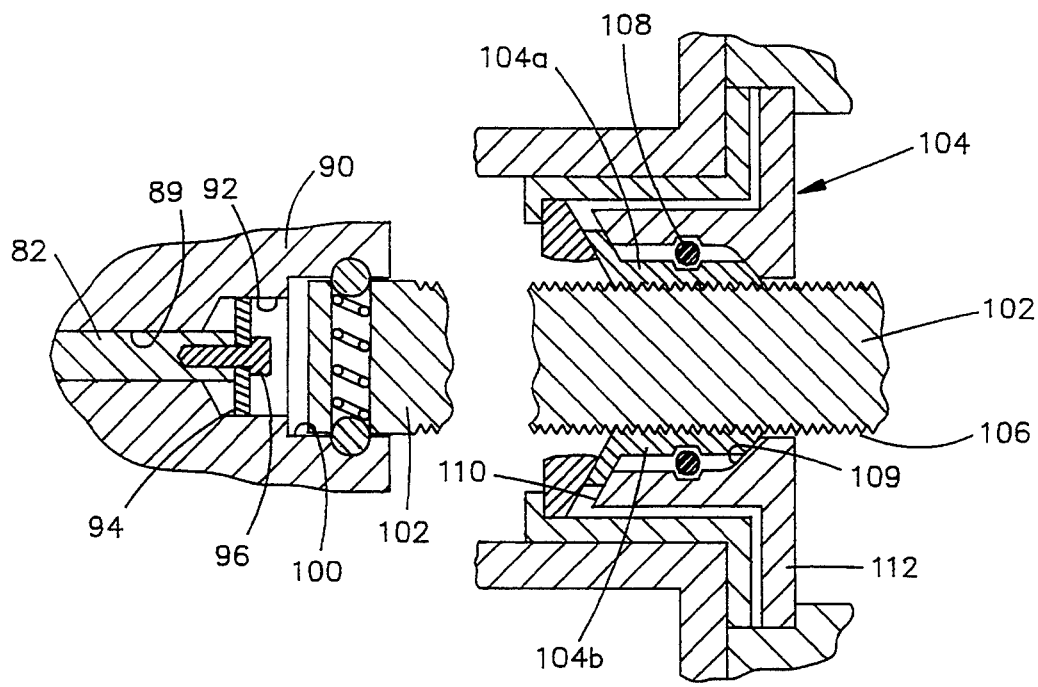
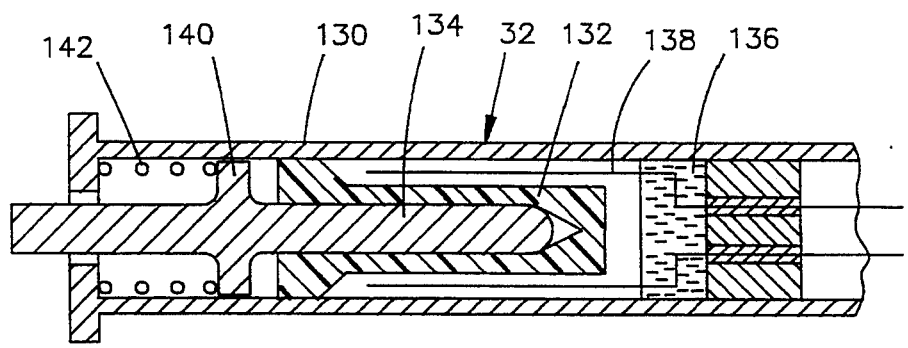

CONNECTOR SYSTEMS FOR STRUCTURES

ORIGIN OF THE INVENTION

The invention described herein was made in the performance of the work under a NASA contract and is subject to the provisions of Section 305 of the National Aeronautics and Space Act of 1958, Public Law 85-568 (72 Slat. 435; 42 U.S.C. 2457).

BACKGROUND OF THE INVENTION

1Field of the Invention

This invention relates to apparatus for releasably connecting structural members to one another and more particularly, to a connector system for interconnecting structural members with one way non-rotational linear motion of an actuating member and for disconnecting the structural members using rotational motion of the actuating member.

2Description of the Prior Art
Prior Art Patents

U.S. Pat. No. 4,998,842 issued to P. L. Sheridan on Mar. 12, 1992 (Class 403/252) relates to a quick connect fastener which is designed for use by astronauts and robots in outer space for quickly interconnecting and releasing structural members. The device utilizes an offset crank mechanism which is manually actuated to move an actuator with a linear non-rotational motion to couple and uncouple the quick connect fastener.

U.S. Pat. No. 4,763,459 issued to C. J. Wesselski on Aug. 16, 1988 discloses a fastener system for assembly of structures in outer space. Truss members are provided with "node point" fittings formed on hollow spherical shells respectively having a number of spatially-disposed outwardly facing openings into which tubular inserts are mounted. Each of the end fittings has a forwardly projecting multifingered collet which is inserted into one of the tubular inserts and expanded for releasably locking the end fitting to the node fitting point. The expansion of the collet cart be by a mechanical chuck type mechanism or by a leverage mechanism.

U.S. Pat. No. 4,232,497 issued to A. Meschnig on Nov. 11, 1980 (Class 52/506) relates to a securing device which includes a tubular carrier 3 (attached to a ceiling) with a guide member 31 which has a frusto conical opening 32. A partially spherical nut member 30 is located in the carrier 3 and has a threaded bore 9. The bore 9 has a flared opening 32. A screw 13 with a tip 15 is insenable into the bore 9. Pins 34 align the nut 30 in the carrier 3. The tip 15 provides guidance for alignment with the nut 30.

BACKGROUND

In future space operations, it is proposed to connect prefabricated truss members to form space assemblies. In space it is desirable to have light weight, low energy operated connector systems for automatic and/or remote operations and to avoid manual operations wherever possible. Similarly, in a normal earth environment, the use of automatic and remote operators for actuating connectors is often desirable and preferable to manually operated connector systems.

In connecting truss members to one another, the connector systems are usually located at a "node-point" or corner locations. The pertinent prior art connector system typically has a socket member with a latching recess in one truss member and collet type fastener in the other truss member where a collet member is manually actuated by a mechanical leverage mechanism. (See U.S. Pat. No. 4,763,459 and 4,998,842) or by a chuck type mechanism (U.S. Pat. No. 4,763,459).

The disadvantage of the prior art systems is the complexity of the mechanical systems, exposed mechanisms and in some cases the need for a motorized drive where the leverage mechanism does not provide sufficient force. Motorized drives are relatively heavy and exposed mechanisms are susceptible to jamming and malfunctions.

SUMMARY OF THE PRESENT INVENTION

In the present invention, truss members which are intended for coupling to one another respectively have a socket member with a latching recess and a collet type fastener. The collet type fastener has normally retracted collet latching fingers which are insertable into the latching recess. A collet expander member is movable longitudinally relative to the latching fingers between a first position where the latching fingers are retracted and a second position where the latching fingers are extended.

A drive system is provided to impart linear non-rotative motion to the expander member between the first and second positions. The expander member has a threaded portion which passes through a one-way ratchet nut which permits the linear non-rotational motion between the first and second positions but prevents a linear non-rotational return motion. Thus, the drive system can produce a one way linear motion and the ratchet nut provides a locking action of the expander member.

The preferred drive system is a paraffin actuated mechanism where an elongated actuator rod is located in an elastomer boot or tube member. Solid paraffin is located in a chamber about the boot member. An electrical current heater is used to heat the paraffin which liquifies and expands to exert force on the boot member and move the actuator rod linearly in one direction. Upon discontinuing of the electrical heating, a spring mechanism retracts the actuator rod as the paraffin solidifies.

The expander member (which engages an end of the activator rod) has a non-circular end portion which is slidably and non-rotatively received in a central non-circular bore of a worm gear wheel. After the activator rod moves the expander member to the second position, the expander member can be moved from a second position to a first position, by rotating the worm wheel. The worm wheel is driven by a worm gear drive member which is mechanically actuated. Rotation of the expander member in the rachet nut threadedly moves the expander member in an opposite linear direction through the one-way ratchet nut and uncouples the connector.

DESCRIPTION OF THE DRAWINGS

FIG. 5 is a view taken along line 5—5 of FIG. 3;

FIG. 6 is a view in longitudinal cross-section through an active paraffin actuator means;

FIG. 7 is a enlarged view in cross-section of components in the mechanism; and

FIG. 8 is a view in cross-section to illustrate the one-way ratchet nut.

DESCRIPTION OF THE INVENTION

Figure 1:
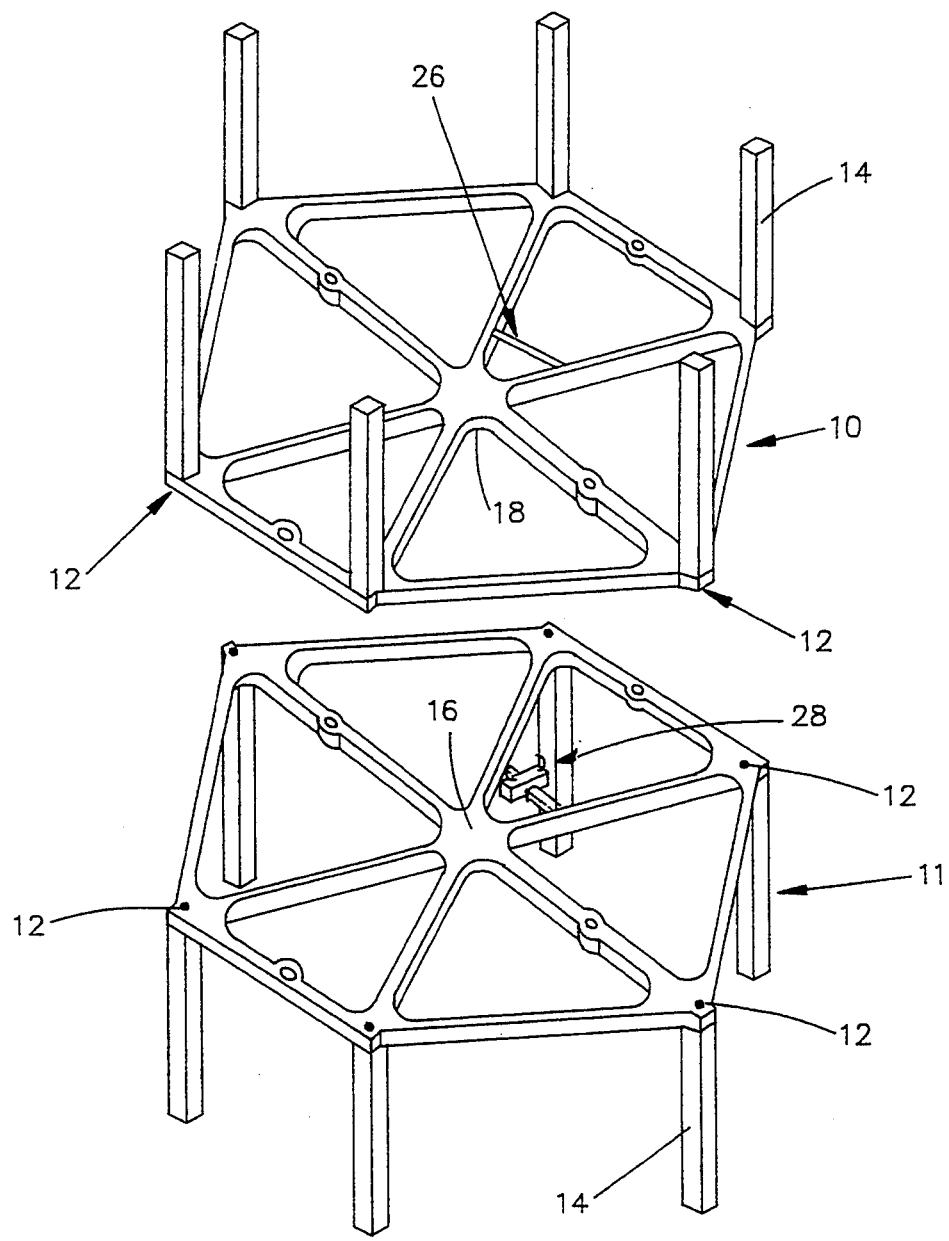
FIG. 1 is a perspective view of two truss assemblies in position for assembly.

Referring now to FIG. 1, a pair of prefabricated trusses 10 and 11 are illustrated in a face-to-face relationship where the trusses are releasably fastened at node points or corners 12. In the illustrated construction, rectangularly shaped structural members 14 (longerons) extend perpendicularly from the planes of facing surfaces 16 and 18 of the trusses.

Figure 2:
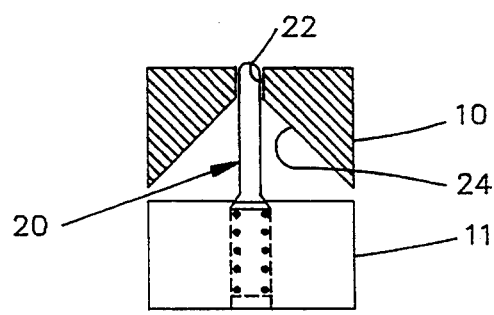
FIG. 2 is a view in cross-section to illustrate guide locator means.

In coupling the trusses to one another, one truss 11 has a set of alignment pins 20 located so as to align with guide openings 22 on the other truss 10 (see FIG. 2). The guide openings 22 are tapered (at 24) to facilitate entry of the pins 20 for alignment purposes. A latch bar 26 on one of the trusses 10 is aligned relative to a capture latch mechanism 28 on the other truss 11. When the guide pins 20 are in the guide openings 22, the latch mechanism 28 attaches to the latch bar 26 to provide an initial coupling of the masses 10 and 11 to one another.

The trusses are fastened to one another at the corners by a connector system which includes a gripping collet mechanism 30 (See FIG. 3 and 4) with an actuating mechanism 32 located in one of the masses and a floating receptacle 34 to receive the gripping collet member the other truss.

Figure 3:
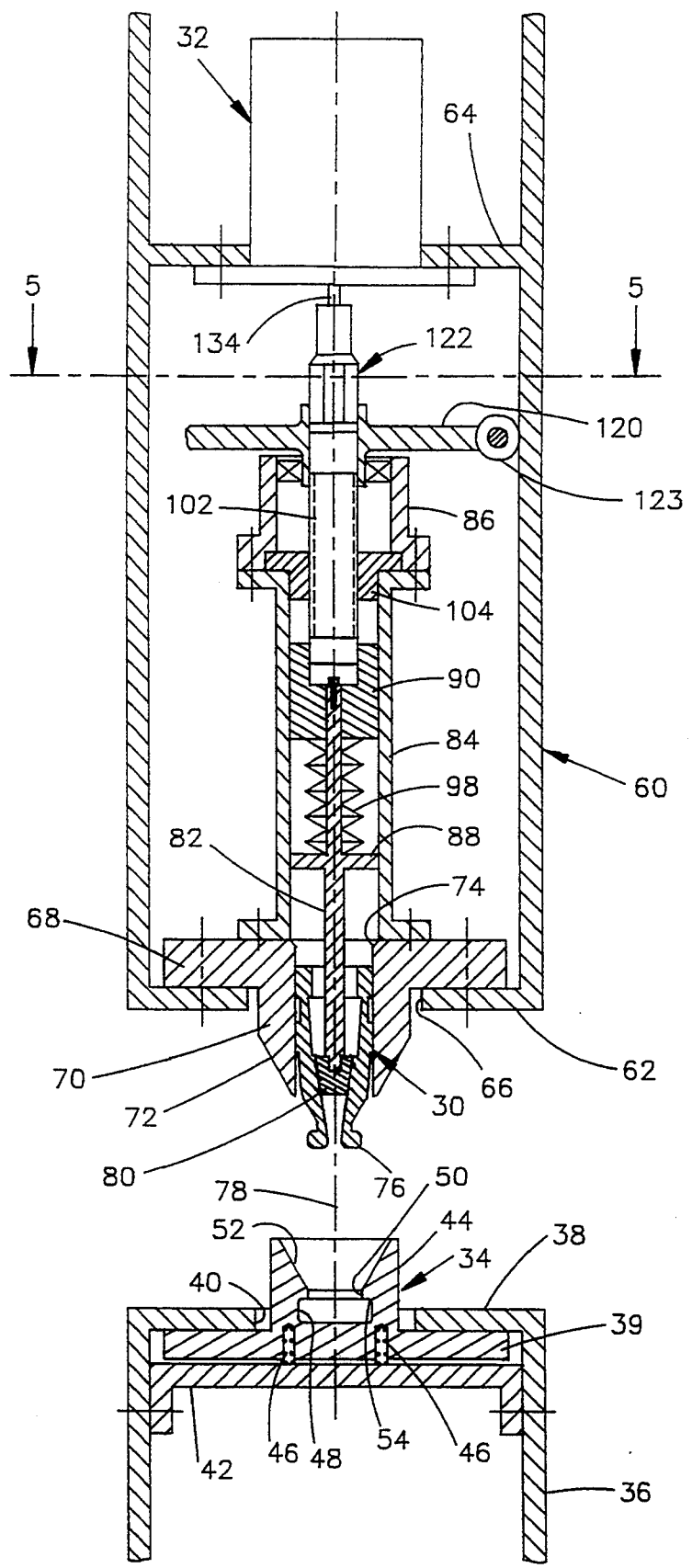
FIG. 3 is a view in longitudinal cross-section through the connector apparatus prior to coupling.
Figure 4:
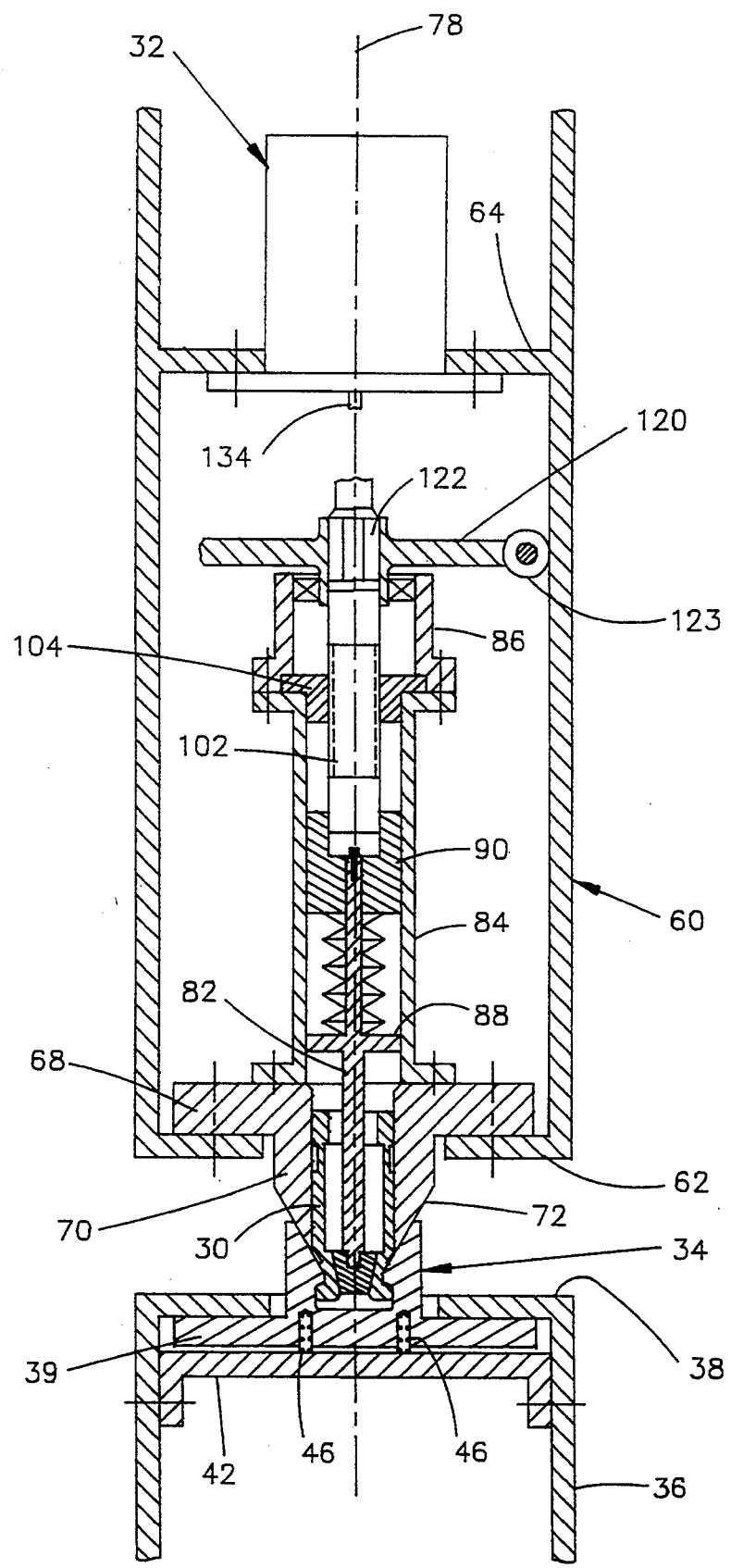
FIG. 4 is a view similar to FIG. 3 but showing the connector apparatus after coupling.

The connector system, as illustrated in further detail in FIG. 3 and FIG. 4, is in a truss or a hollow ann member or housing 36 with a forward wall 38 which has a central opening 40. In the housing 36 is a plate member 42 which defines a rear wall and an enclosure with respect to the forward wall 38. The floating receptacle 34 includes a plate member 39 located for limited movement between the forward, rearward and side walls of the enclosure. The plate member 39 has a socket extension 44 which extends outwardly through the opening 40. Spring members 46 are disposed in the plate member 39 in the enclosure to bring the plate member frictionally into engagement with the forward end wall 38. As can be appreciated, the cross-sectional configuration of the enclosure and the plate member 39 can be cylindrical, square or any other shape which permits a limited "floating" action for the plate member relative to the housing 36.

The socket extension 44 has a centrally located internal cylindrical locking recess 48 which opens to an intermediate smaller bore portion 50 and where the bore portion 50 extends to an outer frusto conical wall surface 52. Between the bore portion 50 and the recess 48 is an inner frusto conical locking wall surface 54. The inner frusto conical wall surface 54 is utilized for latching purposes; the outer frusto conical wall surface 52 is used for guiding purposes.

The gripping collet mechanism 30 for the connector system is mounted within a housing member 60 which has a forward end wall 62 and rearward end wall 64 which define an enclosure in the housing member 60. The forward end wall 62 has an opening 66. A base member 68 with a projecting probe element 70 is attached to the end wall 62 so that the probe element 70 extends outwardly from the end wall 62. The probe element 70 has an outer frusto conical surface 72 at an angle which is complimentary to the outer wall surface 52 of the socket extension 44. The probe element 70 thus can align itself within the socket extension 44.

The probe element 70 has a central bore which has an internally located threaded portion 74 which threadedly receives one end of the tubular collet member 30. The tubular collet member 30 has collet fingers 76 which project outwardly from the end of the probe element 70. The collet fingers 76 are normally resiliently biased inwardly toward a central axis 78 and the inner surfaces of the collet fingers 76 have a frusto conical configuration about the central axis 78. The outer surfaces of the collet fingers are recessed to form terminal latch elements with inclined surfaces arranged to cooperate with the inclined frusto conical surface 54 of the socket extension 44.

The collet fingers 76 are actuated by an actuating mechanism which includes a frusto conically shaped actuator head 80 disposed within the collet fingers and which is attached to an actuator member 82. The tubular actuator member 82 is disposed in a tubular guide housing 84 which has ranged ends. One ranged end of the guide housing 84 is attached to the base member 68 and its other ranged end is attached to a tubular bearing housing 86.

Intermediate of the length of the actuator member 82 is a flange 88 which is slidable in the guide housing 84. The end of the actuator member 82 is slidably received in a bore 89 of a spacer guide 90 (See FIG. 7). The spacer guide 90 is slidable in the guide housing 84 and has a counter bore 92 which accommodates a stop ring 94. The stop ring 94 is attached to the end of the actuator rod 82 by a bolt 96. Belleville spring washers 98 (FIG. 3) are disposed on the actuator rod 82 between the flange 88 and the spacer guide 90 and resiliently extend the spacer guide 90 and the flange member 88 in opposite directions. When the spacer guide 90 is moved in one direction longitudinally relative to the actuator rod 82 in a direction to actuate the collet fingers 76, it exerts a force on the spring washers 98 which, in turn, develop a spring force loading on the flange 88.

The spacer guide 90 has a second counterbore 100 (FIG. 7) which defines an opening to rotatively receive an end of a threaded bolt member 102. The bolt member 102 is threadedly supported in a ZIPNUT mechanism 104. The ZIPNUT mechanism is a commercially available one-way segmental nut which permits longitudinal non-rotative linear movement in one direction and permits reverse longitudinal linear motion only by rotation. Linear motion by rotation is possible in either direction. (i.e. The ZIPNUT acts as a standard nut when a bolt is rotated through it.) The ZIPNUT mechanism 104 is located between the bearing housing 86 and the guide housing 84.

As shown in FIG. 8, the ZIPNUT mechanism 104 includes three internally threaded segments 104 ($a$–$c$) which are disposed about the threaded portion 106 of the bolt member 102 and retained in engagement therewith by an annular spring member 108 (FIG.7). The segments 104($a$–$c$) have angular end portions 109, 110 which permit a sliding and radially outward movement when the bolt member 102 moves in one direction and which wedge into contact with inclined surfaces in a housing 112 when a force on the bolt member 102 is applied in an opposite direction. Thus, the segments 104 ($a$–$c$) permit a one-way linear motion in one direction but prevent linear motion in an opposite direction. However, when the bolt member is rotated, the threads permit longitudinal linear motion of the bolt member 102 in either direction. (Thus, rotation of the bolt member can both actuate and release the collet fingers.)

Mounted in the bearing housing 86 is a worm gear wheel 120 which has non-circular or splined bore which slidably receives a non-circular or splined section 122 of the bolt member 102 (See FIG. 5). Thus, the bolt member 102 is slidably and co-rotatively coupled to the worm gear wheel 120. The worm gear wheel 120 is meshed with a driver worm gear 123 mounted in the housing 60 with an exterior wrench or socket end 124 for manual rotation of the worm gear 122. Thus, when the worm gear 123 is rotated in one direction, the bolt member 102 moves longitudinally and removes the expander head 80 from the locking position with the collet fingers 76. If the bolt member is rotated in an opposite direction, the bolt member 102 can be moved longitudinally to actuate the collet fingers 76.

Referring now to FIG. 6, a paraffin linear actuator 32 is schematically illustrated. This type of actuator is manufactured by Starsys Research of Boulder, Colo. The actuator 32 has an outer housing 130 which contains an inner tubular squeeze boot member 132 which receives a tubular actuator member 134. The boot member 132 and actuator member 134 are in an enclosure containing a solid paraffin material 136 and a heating element 138, when the paraffin is heated it converts from a solid to a liquid phase and incurs a volumetric expansion which provides a hydrostatic pressure on the boot member 132. The hydrostatic pressure produces a linear force of the actuator rod 134 in one direction. The actuator rod 134 has a flange 140 which compresses a spring 142 upon movement of the actuator in the one direction. When the heating is discontinued, the paraffin is cooled and contracts to a solid and the spring 142 returns the actuator rod 134 towards its initial position.

In operation, the truss members 10 and 11 (FIG. 1) are brought into alignment and the pins 20 aligned with the openings 22. The latch mechanism 28 provides a preliminary coupling of the structures while the collet fingers 76 are inserted into extension sockets 44. The heater in the paraffin actuator 32 is turned on and the rod 134 moves the actuator member 82 in a linear direction to latch the fingers 76 in the latching recess 48. The belleville springs 98 are compressed and apply a spring loading force on the latching fingers. Upon cooling of the paraffin, the rod 134 retracts (FIG. 4). The actuator 82 is held in place by the bolt member 102 in the ZIP-NUT mechanism 104.

Alternatively, should the actuator 32 malfunction, the worm gear 123 can be manually turned to actuate the actuator member 82.

To release the coupling, the worm gear 123 is rotated manually in an opposite direction which moves the threaded bolt member 102 in a direction which develops a rotational force to move the spacer member 90 and actuator member 82 so that the collet fingers 76 are released from the recess 48.

It will be appreciated that while a paraffin actuator is preferred, a wide variety of actuators such as pneumatic, pyrotechnic or hydraulic systems can be utilized to provide a linear motion. It can also be appreciated that the relative rotation between the bolt and nut can be derived by arranging the nut to rotate relative to the bolt member.

It will be apparent to those skilled in the art that various changes may be made in the invention without departing from the spirit and scope thereof and therefore the invention is not limited by that which is disclosed in the drawings and specifications but only as indicated in the appended claims.

We claim:

1. A fastener for coupling two facing structural members to one another, said fastener comprising:
    a socket member in one structural member having an opening extending to a locking recess:
    an elongated tubular member in the other structural member, said tubular member having resiliently arranged collet fingers radially movable relative to a central axis between a contracted position and an expanded position;
    an elongated expander member disposed within said tubular member and movable longitudinally between first and second positions for moving said collet fingers between said contracted and said expanded positions;
    said collet fingers and expander member being insertable into said opening for locating locking portions on said collet fingers in said locking recess so that movement of said collet fingers to an expanded position attaches the structural members to one another; and
    first means for moving said expander member longitudinally only in a first direction between said first and second positions in response to linear force, and second means for moving said expander member longitudinally in either direction along its longitudinal axis in response to rotational force;
    wherein said first means includes a source of energy which develops a force on said expander member in response to volumetric expansion of a fluid.

2. The apparatus as set forth in claim 1 wherein said source of energy is a paraffin actuating device.

3. The apparatus as set forth in claim 1 wherein said expander member is slidably attached to a spacer member and said spacer member is slidably mounted in a housing and said first means acts on said spacer member.

4. The apparatus as set forth in claim 3 wherein said second means includes a threaded bolt member disposed between said first means and said spacer member and wherein a gear member is slidably and co-rotatively mounted on said bolt member and where said bolt member is threadedly received in a one-way threaded nut means so that rotation of said gear member moves said bolt member longitudinally and said bolt member can be moved longitudinally in one direction by said first means.

5. A fastener for coupling two facing structural members to one another, said fastener including
    a socket member in one structural member, said socket member having an opening extending to an internal locking recess;
    an elongated tubular member in the other structural member, said tubular member having resiliently arranged collet fingers radially movable relative to a central axis between a contracted position and an expanded position;
    an elongated expander member disposed within said tubular member and movable longitudinally between first and second positions for moving said collet fingers between said contracted and said expanded positions;
    said collet fingers and said expander member being insertable into said opening for locating locking portions on said collet fingers in said locking recess so that movement of said collet fingers to an expanded position attaches the structural members to one another;

a tubular housing attached to said tubular member;

a spacer member slidably received in said housing and slidably receiving said expander member;

resilient means disposed between said spacer member and said expander member for providing a resilient loading force on said expander member;

an actuator rod slidably received in said housing and disposed in engagement with said spacer member for conjunctively moving with said expander member between said first and second positions, said actuator rod having a threaded portion along its length;

ratchet nut means in said housing for threadedly receiving said threaded portion and for permitting linear movement between said first and second positions and linear movement between said second and first positions in response only to relative rotation between said threaded portion and said ratchet nut means;

rotation means for selectively rotating said threaded portion relative to said ratchet nut means; and power means in said other structural member for developing a linear force on said expander member for moving said expander member between said first and said second positions.

6. The apparatus as set forth in claim 5 wherein said power means is a paraffin actuating device.

7. The apparatus as set forth in claim 6 wherein said rotation means includes a worm wheel and a worm gear where said actuator rod is slidably and co-rotatively mounted in said worm wheel.

8. The apparatus as set forth in claim 7 wherein the opening of the socket member and an outer surface of the tubular member are complimentarily tapered for engagement with one another.

9. A fastener for coupling two facing structural members to one another, said fastener including a socket member in one structural member, said socket member having a tapered opening extending to an internal locking recess;

a nose piece member in said other structural member, said nose piece member having an outer tapered surface sized for receipt in said tapered opening;

an elongated tubular member disposed in a bore in said nose piece member, said tubular member having resiliently arranged collet fingers radially movable relative to a central axis between a contracted position and an expanded position;

a tubular housing attached to said nose piece member, an elongated expander member disposed within said tubular member and movable longitudinally between first and second positions for moving said collet fingers between said contracted and said expanded positions;

said collet fingers and said expander member being insertable into said opening for locating locking portions on said collet fingers in said locking recess so that movement of said collet fingers to an expanded position attaches the structural members to one another;

a spacer member slidably received in said housing and slidably receiving said expander member;

resilient means disposed between said spacer member and a flange on said expander member for providing a resilient loading force on said expander member;

an actuator rod slidably received in said housing and disposed in engagement with said spacer member for conjunctively moving with said expander member between said first and second positions, said actuator rod having a threaded portion along its length;

ratchet nut means in said housing for threadedly receiving said threaded portion and for permitting linear movement between said first and second positions and for permitting linear movement between said second and first positions in response only to relative rotation between said threaded portion and said ratchet nut means;

rotation means for selectively rotating said threaded portion relative to said ratchet nut means; and power means in said other structural member for developing a linear force on said expander member for moving said expander member between said first and second positions.

10. The apparatus as set forth in claim 9 wherein said power means is a paraffin actuating device.

11. The apparatus as set forth in claim 9 wherein said rotation means includes a worm wheel and a worm gear where said actuator rod is slidably and co-rotatively mounted in said worm wheel.

* * * * *